UNITED STATES PATENT OFFICE.

MARIO AROSIO, OF MILAN, ITALY.

IMPERMEABLE AND NON-HYGROSCOPIC MATERIAL.

1,355,586.   Specification of Letters Patent.   Patented Oct. 12, 1920.

No Drawing.   Application filed June 23, 1919. Serial No. 306,164.

*To all whom it may concern:*

Be it known that I, MARIO AROSIO, manufacturer, subject of the King of Italy, resident of Milan, 2 Via Carlo Cattaneo, in the Kingdom of Italy, have invented new and useful Impermeable and Non-Hygroscopic Material, of which the following is a specification.

As well known, vulcanized fiber is not completely impermeable or at least its surface presents hygroscopic properties which in the long run impair the mechanical strength and the insulating properties of the material.

The subject matter of the present invention is a novel insulating material which does not present the said inconveniences.

The novel material consists in vulcanized fiber coated with a film of celluloid or acetylcellulose, care being taken that the coating substance be evenly distributed over the surface and made to penetrate the surface pores, so that after drying no discontinuities be left. The resulting vulcanized fiber product is thus coated with a protecting film that prevents humidity from passing through. The coating can be obtained by immersion or any other method, such for instance, by the method forming the subject matter in my copending application 306,193, filed June 23, 1919.

Having now described my invention and how the same is to be carried out; what I claim as my invention is:

Impermeable non hygroscopic material consisting of vulcanized fiber coated with a film of celluloid or acetylcellulose firmly adhering to the supporting surface.

In testimony whereof I affix my signature.

MARIO AROSIO.